I. WELTY.
Sulky Cultivator.

No. 80,102.    Patented July 21, 1868.

UNITED STATES PATENT OFFICE.

ISAAC WELTY, OF OLNEY, ILLINOIS.

IMPROVEMENT IN SULKY-CULTIVATORS.

Specification forming part of Letters Patent No. 80,102, dated July 21, 1868.

*To all whom it may concern:*

Be it known that I, ISAAC WELTY, of Olney, in the county of Richland and State of Illinois, have invented a new and useful Improvement in Sulky-Cultivators; and I do hereby declare that the following is a sufficiently full, clear, and exact description thereof to enable one skilled in the art to which my said invention appertains to make and use it, reference being had to the accompanying drawings, which are made a part of this specification.

My improvement consists of a novel and simple arrangement of devices for adjusting the plows for different depths and widths of rows, as hereinafter described.

Figure 1:
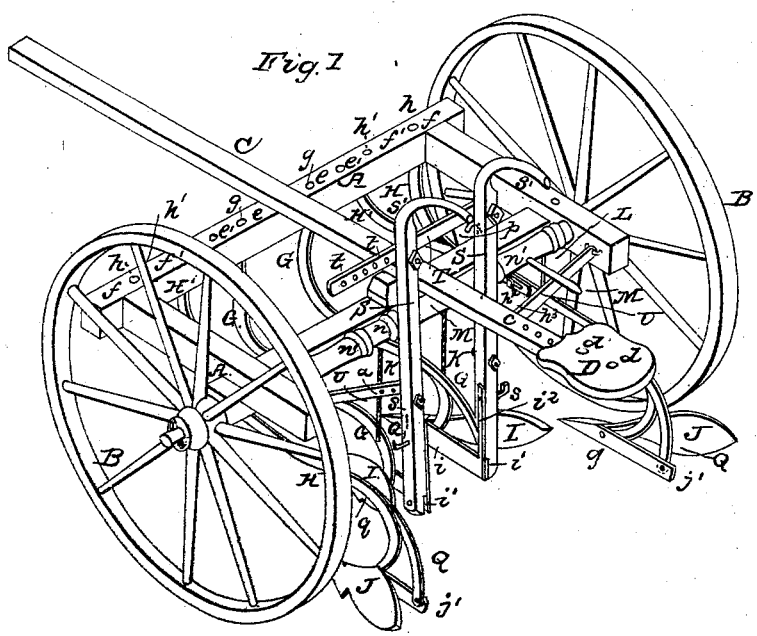
Figure 2:
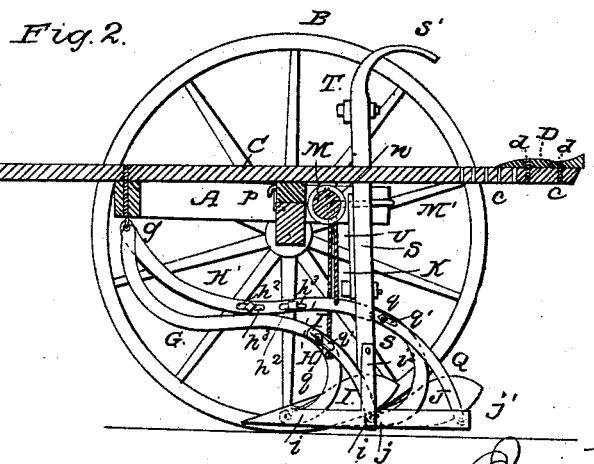

In the drawings, Figure 1 is a perspective view of my improved cultivator, and Fig. 2 a longitudinal section thereof.

A may represent the frame of the machine, B the wheels, C the tongue, and D the driver's seat, the latter being secured in place by the pins or bolts $d$, passing through suitable perforations, $c$, in the rear end of the tongue C, a number of said perforations being provided to admit of the longitudinal adjustment of the seat. The front bar of the frame A is provided with perforations $e$ $e'$ and $f f'$, for the reception, respectively, of the eyebolts $g$ and $h$ $h'$. To the eyebolts $g$ and $h$ the beams G and H of the plows I and J are attached, and to the ones $h'$ are attached the lateral braces H' of the beams H. The braces H' are connected to the beams H by bolts $h^2$, passing through oblong slots $h^3$ in said braces, which are thus adapted to adjust the plows J relatively to the land. The beams G and H are connected by cords or chains K and L to the roller M, which is provided with grooved enlargements or pulleys $n$, $n'$, and $o$ for their reception. The roller M has a handle, M', by which to turn it, and is held in the position it has assumed when the plows are elevated by the engagement of said handle with the hook $p$. The beams G H are connected to the plows I J by a pivot-joint at $i$ and $j$, (said connection being near the point of the plow,) and by links or bars Q to the rear end of their landside-bars at $i'$ and $j'$, said bars being attached to the beams G and H by bolts $q$, oblong slots $q'$ being provided in said bars for the reception of the bolts, to allow of the vertical adjustment of the rear end of the plows to regulate their cutting depths.

The plows I J, I prefer to construct in the manner described in the patent of Jas. C. Duncan, dated May 14, 1867—*i. e.*, of a single piece of wrought-iron or steel, and of the form shown, the rear end of the landside-bar of the inner ones, I, having a vertical extension, $i^2$, for the attachment of standards S. These standards are provided at a convenient height for the driver's feet with stirrups or foot-rests $s$, and at their upper ends with handles $s'$ for guiding said inner shovels.

The attachment of the standards S to the arms $i^2$ of the plows may be formed by the shanks of the foot-rests $s$ and pivots $i'$ of the straps Q, as shown. The standards are connected at their upper ends by a bar, T, and at a suitable point below the frame by bars U to the respective sides of the frame. One or both ends of the bar T and the inner ends of the bars U are provided with a plurality of perforations, $t$ and $u$, for the passage of their attaching-bolts, to allow of the lateral adjustment of the shovels I, said adjustment being capable of extension by placing the eyebolts $g$ in the holes $e'$ and attaching the supporting cords or chains K in the grooves or pulleys $n'$.

Having thus described my invention, the following is what I claim as new and desire to secure by Letters Patent:

1. In combination with the outer shovels or plows, H J, the lateral braces H', rendered adjustable by means of the slots $h^3$ and bolts $h^2$, in the manner shown and described, for the purpose set forth.

2. The combined arrangement, with the inner shovels, G I S, of the perforations $e$ $e'$, for the reception of their attaching-eyebolts $g$, the pulleys $n$ $n'$, for the reception of their elevating ropes or chains K, and the perforated bars T U U, as and for the purpose specified.

To the above specification of my sulky-cultivator I have signed my hand this 18th day of April, A. D. 1868.

ISAAC WELTY.

Witnesses:
  AARON E. WELTY,
  OSLEM HENRY.